United States Patent [19]
Bilenko et al.

[11] Patent Number: 5,723,848
[45] Date of Patent: Mar. 3, 1998

[54] HEATING CABLE CONTROL AND MONITORING METHOD AND SYSTEM

[75] Inventors: George Bilenko, Stamford, Conn.; Jules G. Leibman, White Plains, N.Y.; Shimon Meiler, Dix Hills, N.Y.; Victor Zelmanovich, Deer Park, N.Y.

[73] Assignee: Intech 21, Inc., Deer Park, N.Y.

[21] Appl. No.: 586,098

[22] Filed: Jan. 16, 1996

[51] Int. Cl.$^6$ ...................................................... H05B 1/02
[52] U.S. Cl. ........................... 219/508; 219/483; 219/486; 219/494; 392/468; 392/490; 392/480; 340/870.17
[58] Field of Search ........................... 392/468, 490, 392/469, 479, 480; 219/483–486, 501, 497, 506, 508, 494; 340/870.17, 310 R, 584; 374/166

[56] References Cited

U.S. PATENT DOCUMENTS

| | | | |
|---|---|---|---|
| 4,114,023 | 9/1978 | Zelinka et al. | 219/471 |
| 4,540,875 | 9/1985 | Buttolph, III | 219/364 |
| 4,667,194 | 5/1987 | Frank | 340/870.17 |
| 4,908,498 | 3/1990 | Kivela | 219/494 |
| 5,280,422 | 1/1994 | Moe et al. | 364/140 |
| 5,566,879 | 10/1996 | Longtin | 236/46 R |

*Primary Examiner*—Mark H. Paschall
*Attorney, Agent, or Firm*—Sprung Kramer Schaefer & Briscoe

[57] ABSTRACT

A method and system for controlling heating cables wherein a plurality of two-conductor heating cables are disposed in contact with heatable vessels to heat the vessels. Power lines having at least two conductors are connected to the heating cables through a plurality of first switches. Each first switch is responsive to a control signal for selectively connecting and disconnecting one heating cable to and from the power lines. Each of a plurality of remote terminals is connected to the two conductors of a heating cable and detects the temperature of the heatable vessel heated by the heating cable. At least one main controller for controlling a plurality of first switches is connected to two of the power line conductors. Temperature data relating to temperatures detected by the temperature sensors is transmitted from the remote terminals over the heating cables and the power lines by spread spectrum data transmission to the main controller. A plurality of control signals is produced as a function of the temperature data and is applied by the main controller to the first switches.

23 Claims, 8 Drawing Sheets

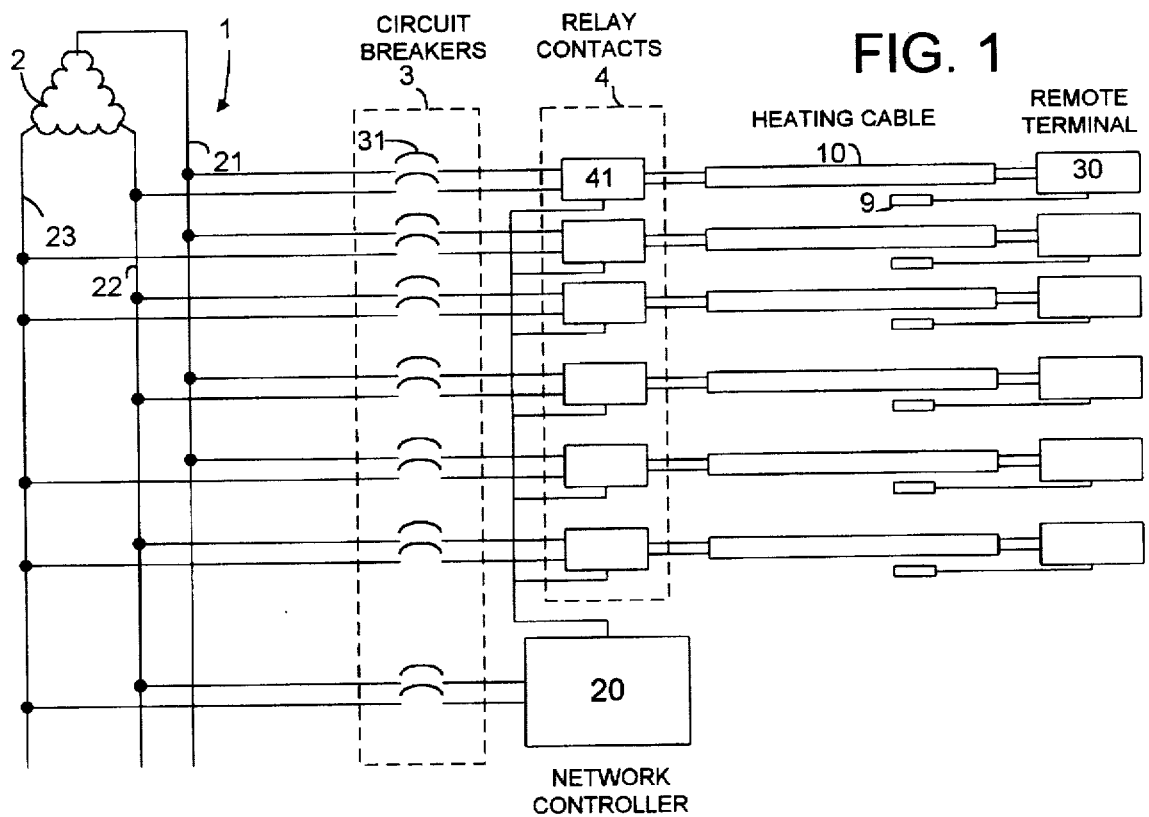
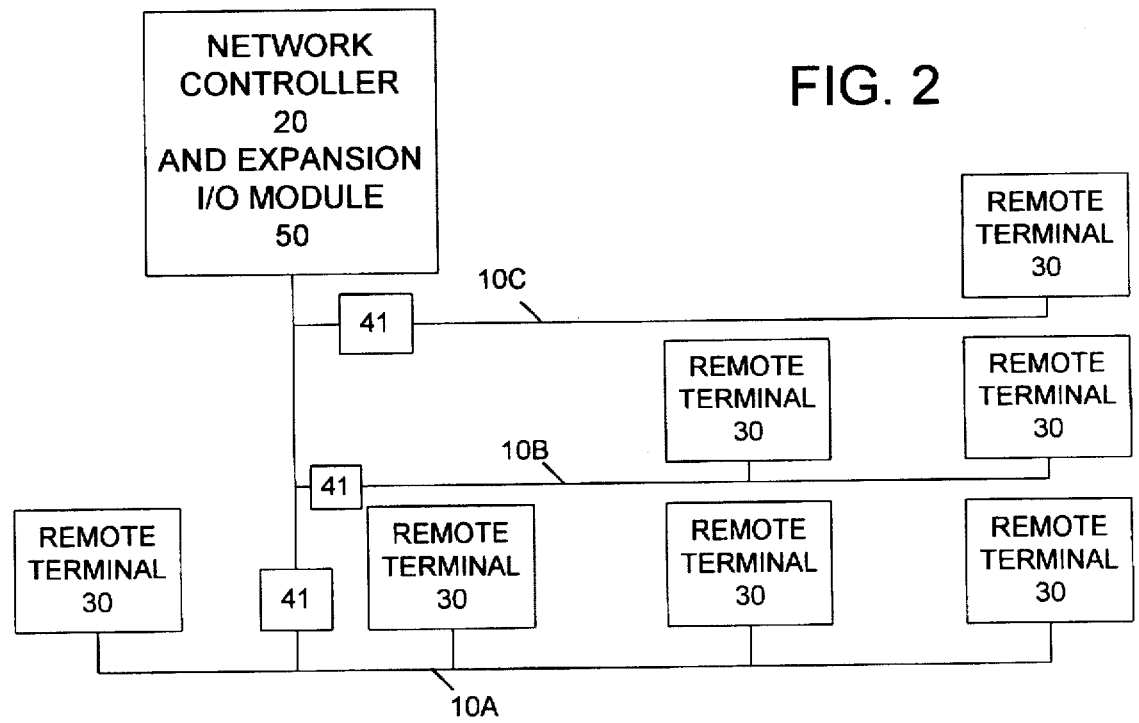

HEATING CABLE CONTROL AND MONITORING METHOD AND SYSTEM

BACKGROUND OF THE INVENTION

The present invention relates to the control and monitoring of heating cables.

Heating cables, such as XL-Trace™ self-regulating heaters manufactured by Raychem Corporation of Menlo Park, Calif., are specially designed for freeze protection of metal and plastic water pipes in commercial, institutional and residential construction applications.

These heating cables are self-regulating in that two parallel bus wires are separated by a self-regulating conductive core. Current flows between the two bus wires independently at each point along the heating cable. The self-regulating conductive core of the heating cable continuously adjusts its heat output in response to pipe temperature, providing a freeze protection system that gives the user the correct amount of heat at each point along the pipe. It is apparent that if there is a failure or fault condition, there will be frozen pipes, process fluid degradations and other costly problems. Also, the self-regulating heating cables require a lot of energy to operate and there is no provision for energy conservation in freezing conditions.

In order to provide a system for monitoring and controlling the heating cable or heat tracing circuit, a third conductor was added to the heating cable and a monitoring system, for example, the MoniTrace 1000 by Raychem Corporation uses the third conductor in addition to the two bus conductors to monitor and control the heating cable and it uses a thermostat for energy conservation.

Among the disadvantages of this type of system, is that the three conductor cable is more expensive than the two conductor cable.

SUMMARY OF THE INVENTION

The main object of the present invention is to provide a method and system for monitoring and controlling heating cable using only two heating cable conductors.

Another object of the present invention is to utilize spread spectrum communication technology for the monitoring and control of the heating cable to eliminate the need for noise reduction and filtering.

Still another object of the present invention is to control and monitor heating cable without dedicated communication wiring.

A further object of the present invention is to control the temperature of a heatable vessel and preserve energy with a heating cable by turning the heating cable on for a predetermined time period and off for a calculated time period which is a function of the heat loss characteristic of the vessel.

A still further object of the present invention is to enable the expansion of control of additional heating cables by simply daisy chaining of control modules.

These and other features and advantages of the present invention are achieved in accordance with the present invention by a heating cable control and monitoring method and apparatus.

The heating cable control and monitoring method and apparatus is designed to monitor the integrity of the heating cable circuits and to provide control and monitoring capability without dedicated communication wiring.

In accordance with the present invention, communication is carried out by the use of a communication protocol using a spread spectrum communication technique, which allows for noise and interference free operation over power lines. Moreover, the spread spectrum communication technique does not interfere with electrical or electronic devices connected to the same power distribution system.

The process temperature, for example, in the pipe, is preferably monitored at the end of the heating circuit where the cable power output is the lowest. The entire heating cable circuitry including the heating cable, power connections, tees, splices, etc. are also preferably monitored from the end of the heating circuit.

The signals are transmitted back to a control panel over the heating circuit wiring and the spread spectrum communication technique provides error correction during data packet transmission.

The apparatus in accordance with the present invention can be configured as a star or bus network using heating cable power wiring as the communication media. The individual heat tracing circuits can be connected in parallel or in series and a network controller simultaneously communicates with a plurality of remote terminals, allowing simultaneous monitoring and control of a plurality of heat tracing circuits. A plurality of individual network controllers with respective remote terminals can communicate on the same service transformer without signal collision. This is because each remote terminal has a unique address and the address of its associated network controller, allowing simultaneous communication between multiple network controllers and their associated remote terminals.

The system can operate at voltages from 120 volts to 300 volts, with single and three phase power lines. The system is immune to voltage spikes and can withstand megger insulation tests of up to 10,000 volts.

In accordance with the addressing scheme of the present invention, each network controller can simultaneously communicate with up to 22 remote terminals and 16 other network controllers. The network controller together with 5 I/O expansion modules can simultaneous monitor and control up to 22 heat tracing circuits.

The process temperature, i.e., pipe temperature, is monitored by the use of a resistive temperature sensor preferably installed at the end of the heat tracing circuit and connected to the remote terminal. The remote terminal upon a polling sequence from the network controller transmits the temperature values to the network controller and the network controller turns each individual heat tracing circuit on or off, based upon the temperature settings as described hereinafter.

Each remote terminal has a unique address and the address of its network controller, allowing simultaneous communication between multiple network controllers and their respective remote terminals.

The system is designed to monitor the integrity of the heating cables and provide specific temperature monitoring and control as well as a self-diagnostic routine which verifies the integrity of the system's components. In a heat tracing system where thermostats, indirect current sensing or temperature controllers are used, a failure of one of the monitoring system components may be undetected. The system according to the present invention tests the integrity of the entire system continuously. The system will alarm and notify the user of a problem immediately.

Upon initiation of the system, the heating cables stay energized for a maximum of five minutes to run self-diagnostics of the entire heat tracing system, including the heating cable, power wiring, field connections, splices, end of line remote terminals, temperature sensors and associated components of the control and monitoring system.

Based upon the temperature of the pipe, the system determines the rate of temperature drop and initiates a temperature monitoring procedure to energize the cable at the temperature set point. The timing of the monitoring procedure varies automatically, based on the process temperature and the rate of temperature change.

Each heating cable is individually controlled by an end of line temperature sensing device, such as a resistive temperature detector, located on each heated vessel, such as a pipe, at the farthest end of each heating circuit from the power connection point and also at intermediate locations, such as every 500 feet.

Failure of a temperature sensor shall be indicated at the system monitor panel identifying the heating circuit zone number and initiate the common alarm, local indication and remote output.

Each heating cable including all tees can be directly monitored for continuity of all the heating cable bus wires by use of an end of the line remote terminal. The addressability of the system makes it capable of identifying the continuity status of each cable individually. Because of the fact that the system uses spread spectrum communications technology for communicating information over the power transmission lines and heating cables, all monitoring and temperature sensing is provided without additional wiring or noise filtering and/or isolation equipment.

The control system energizes each heating cable when the pipe temperature drops to a set point, for example, 40° to prevent the freezing of water flowing through pipes. The system indicates an alarm condition when the pipe temperature drops to the set point temperature of 35° F. with the heater energized. The system deenergizes the cable when the pipe temperature reaches a maximum temperature set by the user. The control system is fail safe in that a failure of the temperature sensor results in energizing the heating cable and initiating an alarm.

Upon initiation of the system, it remains energized for a maximum of five minutes to run self-diagnostic tests on the entire heat tracing system including the heating cable, power wiring, field connections and splices, end of line remote terminals, temperature sensors and associate components of the control and monitoring system. Thereafter, based upon the temperature of the pipe, the system determines the rate of temperature drop and initiates a temperature monitoring procedure to energize the cable at the temperature set point. The timing of the monitoring procedure is self-adjustable and based on the pipe temperature.

The network controller also has indicator lights for two zones for indicating power on, a common alarm, and for each heating cable or branch, an indication of continuity fault, heater on, low temperature and temperature sensor failure.

The communication protocol transmits information in four byte packets of information at high speed, for example, 10 kbyte/second. The four byte packets include a remote terminal address, temperature data, check sum data and the network controller address. Sampling of temperature information by the remote controller takes place at 100 times per second.

While examples herein are given for water, the system can be used with any heatable vessel, such as tanks, pipes, etc., holding fluids other than water, such as fuel oil, diesel oil and other process liquids.

The system, in accordance with the present invention, for controlling a plurality of heating cables, wherein each heating cable has two conductors and is disposed in contact with a heatable vessel during use to heat the vessel and is connectable to power lines having at least two conductors for applying power thereto, comprises a plurality of first switches each connectable between one heating cable and power lines and each responsive to a control signal for selectively connecting and disconnecting the one heating cable to and from the power lines, a plurality of remote terminals each connectable to one heating cable and having a temperature sensor for detecting the temperature of a heatable vessel heated by the one heating cable and a first spread spectrum transceiver connectable to the two conductors of the one heating cable for transmitting temperature data relating to temperatures detected by the temperature sensor over the one heating cable and the power lines, and at least one main controller for controlling the plurality of first switches and comprising a second spread spectrum transceiver connected to two of the power line conductors for receiving temperature data transmitted from each first spread spectrum transceiver, a processor receptive of the temperature data from the plurality of remote terminals for producing a plurality of control signals as a function thereof and means for connecting each control signal to one first switch. One remote terminal is preferably connected to the end of each heating cable.

The processor produces the plurality of the control signals to connect the heating cables to the power lines for a time period and disconnect the heating cables from the power lines for a calculated time period determined from the temperature data and which is at least equal to a minimum time period. Specifically, the processor produces the plurality of the control signals to connect the heating cables to the power lines for an "on" time period and disconnect the heating cables from the power lines for an "off" time period as a function of the cooling rate of each vessel.

Each at least one main controller comprises at least one expansion module connected to the at least one main controller in a daisy chain and each having means for connecting control signals to different plurality of first switches. The network controller has means for assigning an address to a first expansion I/O module to control and display status for additional zones and wherein each expansion module has means for adding one to its address to assign a different address to a next expansion module in the daisy chain.

The method, in accordance with the present invention, for controlling heating cables, comprises the steps of disposing a plurality of two-conductor heating cables each in contact with a heatable vessel to heat the vessel, connecting power lines having at least two conductors to each heating cable through a plurality of first switches each first switch connectable between one heating cable and the power lines and each first switch responsive to a control signal for selectively connecting and disconnecting one heating cable to and from the power lines, connecting each of a plurality of remote terminals to the two conductors of one heating cable and detecting the temperature of a heatable vessel heated by the one heating cable, connecting at least one main controller, each for controlling a plurality of first switches, to two of the power line conductors, transmitting temperature data relating to temperatures detected by the temperature sensors from the remote terminals over the heating cables and the power lines by spread spectrum data transmission, receiving temperature data transmitted from each remote terminal at the at least one main controller, and producing a plurality of control signals at the at least one main controller as a function of the temperature data and applying each control signal to one first switch.

The plurality of the control signals act to connect the heating cables to the power lines for a time period and disconnect the heating cables from the power lines for a calculated time period determined from the temperature data and which is at least equal to a minimum time period. Specifically, the plurality of the control signals act to connect the heating cables to the power lines for an "on" time period and disconnect the heating cables from the power lines for an "off" time period as a function of the cooling rate of each vessel.

The control signals are applied to different pluralities of first switches by daisy chaining at least one expansion module to each at least one main controller. The network controller assigns an address to a first expansion module and each expansion module adds one to its address to assign a different address to a next expansion module in the daisy chain.

These and other features of the present invention are achieved in accordance with the present invention described in more detail hereinafter with reference to the attached drawings, wherein:

BRIEF DESCRIPTION OF THE DRAWINGS

FIG. 1 is a schematic diagram of a system according to the present invention;

FIG. 2 is a block diagram of an example of the connection of remote terminals with a single network controller;

DETAILED DESCRIPTION OF THE INVENTION

Figure 3:
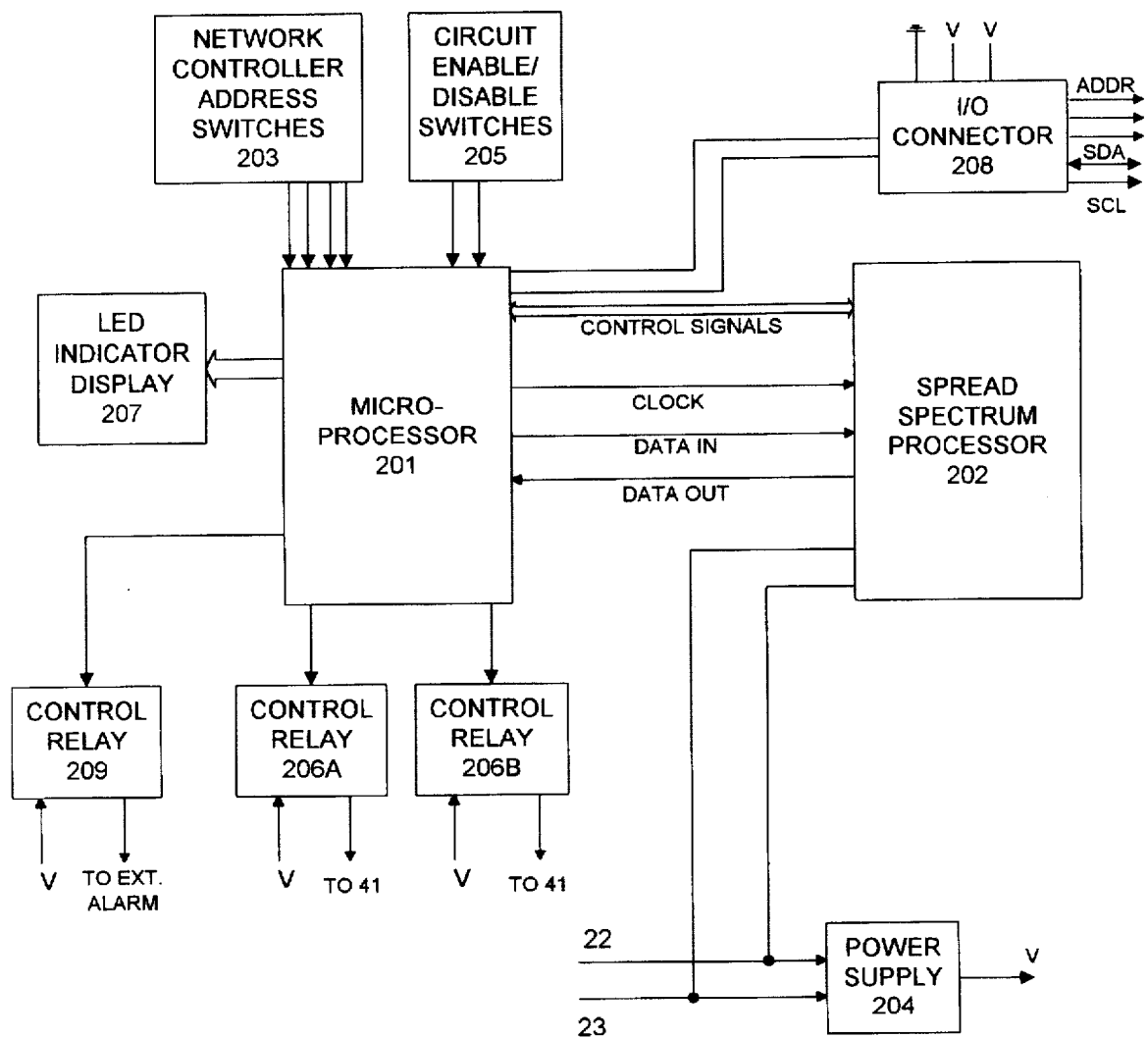
FIG. 3 is a detailed schematic of the network controller shown in FIGS. 1 and 2.

FIG. 1 illustrates one embodiment of the heating cable control and monitoring method and apparatus of the present invention. The system 1 shown therein is connected to the three conductor lines 21, 22 and 23 of a distribution transformer 2. While the three phase power system is shown in FIG. 1, the system can operate at voltages from 120 volts to 300 volts with single and three phase power systems.

As shown, the system includes six heating cables or heat traces 10 connected to the power lines via a circuit breaker panel 3 having individual circuit breakers 31 and a control panel 4 having a set of relay contacts 41 for connecting and interrupting power from the power lines to the heating cable 10. Each of the sets of contacts 41 on the control panel 4 is controlled individually by a network controller 20 which is also connected through the circuit breaker panel to the power lines.

Each heating cable 10 abuts a heatable vessel, for example, a pipe which has a fluid, such as water, flowing therein whose temperature is to be controlled by the heating cable. The heating cable and sensor can be taped or tied onto the vessel or connected by an adhesive. The heating cable is self-regulating and an example is the XL-Trace heating cable manufactured by RayChem Corporation of Menlo Park, Calif. At the end of each heating cable 10 is connected a remote terminal 30 which has a temperature sensor 9 connected thereto and which is positioned on the heatable vessel to measure the temperature thereof.

As can be seen in FIG. 1, each of the remote terminals 30 is connected via the heating cable 10, control panel 4 and circuit breaker panel 3 to the power lines. Each remote terminal 30 is connected to the power lines for a dual purpose, to receive power and to transmit information over the power lines to the network controller 20. Similarly, the network controller 20 is connected to the power lines through the circuit breaker panel 3 to receive power and to receive information from each of the remote terminals 30.

The method used for transmitting information between the network controller 20 and the remote terminals 30 is a communication protocol which allows data packet transmission between the network controller 20 and the remote terminals 30. As a result of the use of a spread spectrum communication technique, noise reducing and filtering devices are not required and the communications protocol does not interfere with the electrical or electronic devices connected to the same power lines.

The spread spectrum communication technique spreads transmission energy over a wide spectrum of frequencies. The technique is a method by which a series of short, self-synchronizing frequency swept chirps act as a carrier. The chirps are always of the same known pattern and are detectable by all of the transceivers on the network. The chirp is swept in the range of 100 to 400 KHz. The technique is preferably implemented with an Intellon Corporation CEMac pl CEBus power line media access card.

While the network controller 20 is shown as connected in a particular way in FIG. 1, FIG. 2 shows that each network controller with an I/O expansion module 50, described hereinafter, can be connected in a variety of architectures, such as a star or bus network. The network controller can simultaneously communicate with up to 22 remote terminals and each power line system can accommodate up to 16 different network controllers, each associated with up to 22 controllable heating cables. The manner in which the system is capable of handling such a number of network controllers and remote terminals without interfering with each other is described hereinafter with regard to the detailed descriptions of each of these devices.

In the connection shown, the network controller is connected in a network with heating cables 10A, 10B and 10C. Heating cable 10A has remote terminals 30 spread at 500 foot intervals, with the actual temperature control data coming from the right-most terminal. Heating cable 10B has an intermediate and end of line remote terminal and heating cable 10C has only an end of line remote terminal.

FIG. 3 shows a detailed view of the circuitry of the network controller shown in FIGS. 1 and 2.

Each network controller 20 includes a microprocessor 201 for controlling the operations thereof. The microprocessor 201 and all of the other elements of the network controller are powered by a power supply 204 which receives a voltage input from power lines 22 and 23 and outputs a DC voltage V. The microprocessor 201 is preferably a Motorola 684C11 microprocessor, however, it can be any current suitable microprocessor on the market which has similar processing capabilities, such as the Intel 8051 processor.

The microprocessor 201 provides a clock signal and inputs data and outputs data and control signals to a spread spectrum processor 202 which is preferably an MACPL240C-made by Intelion. The spread spectrum processor receives and transmits data over the power lines by its connection to power lines 22 and 23. The spread spectrum processor, when receiving data, first despreads the signals and then decodes the despread signal to convert it into data which it applies to microprocessor 201. When data is received from the microprocessor 201, the spread spectrum processor 202 first encodes the data and then spreads the encoded data for transmission over the power lines for receipt by the remote terminals 30.

The microprocessor 201 in the network controller has the capability of controlling and displaying status for two heating cables by means of control relays 206A and 206B and for controlling an external alarm by means of control relay 209. In the case of the relays 206A, 206B and 209, one contact of each of the relays is connected to voltage V and the other contact connected to either the external alarm or to the relays 41 in the control panel 4. When the contacts of a control relay are closed, the voltage V is applied to the relay coils of the associated relay 41 and the contacts are closed and power is applied to the heating cable 10.

The microprocessor also receives inputs from a set of four dip switches 203 which is set by the user to assign an address to the network controller. In this way, each network controller can have any one of $2^4$ addresses. Microprocessor 201 also receives as an input the status of two circuit enable/disable switches 205 which lets the microprocessor know whether any heating cables are applied to the control relays 206A and 206B. Each switch 205 corresponds to one of two zones controlled by relays 206A and 206B.

The microprocessor 201 supplies status signals to LED indicator display 207 which indicates whether of not the network controller power is on, whether or not each of the heating cables controlled by relays 206 are on, whether or not there is a communication failure with the remote terminal of each heating cable, whether or not there is an open line or some other circuit failure, whether or not there is a temperature sensor connected, whether or not there is a low temperature condition for heating cable sensed by a temperature sensor 9 and finally one indicator light indicating that there is any of the above errors, a common failure indicator. In the case of the network controller shown, the LED indicator display includes eight lights.

The network controller also includes an I/O connector 208 which is used to connect to an I/O expansion module for effecting the control of heating cables in addition to the two directly controlled by the network controller itself. The I/O connector has three input lines hardwired to V and ground to define an address 011 for the first I/O expansion module. The I/O connector 208 has at its output three address lines with the address 011 hardwired on the network controller card and a data signal SDA and a clock signal SCL generated by the microprocessor 201. These signals are used to control the I/O expansion modules, as will be explained hereinafter.

Figure 4:
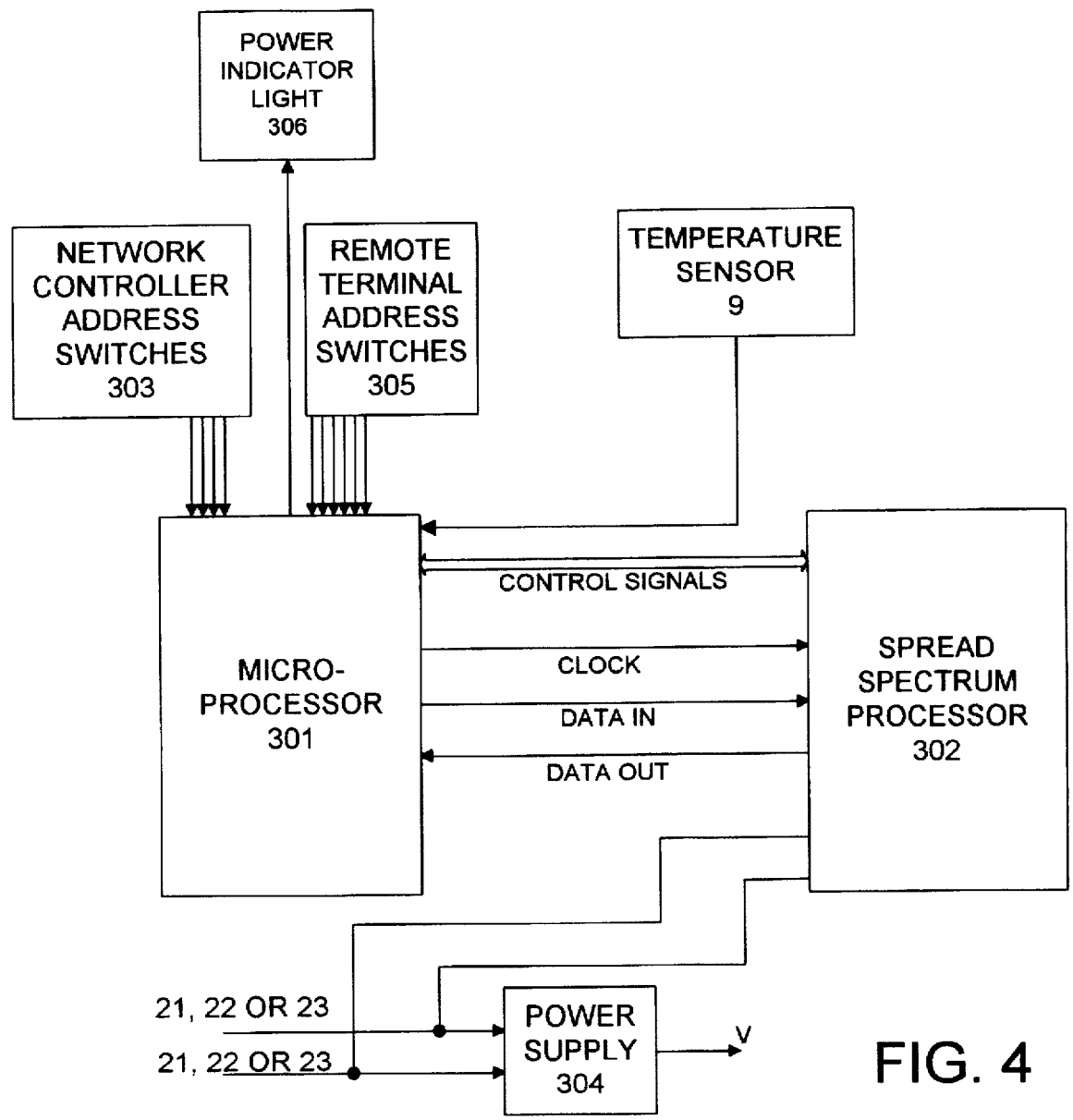
FIG. 4 is a detailed schematic of the remote terminal shown in FIGS. 1 and 2.

FIG. 4 shows a detailed schematic of the circuitry of each remote terminal 30. As in the network controller 20, each remote terminal includes a microprocessor 301 which is preferably the Motorola 684C11, but which can be any other suitable microprocessor, and a spread spectrum processor 302 which is preferably the MACPL240C by Intelion.

As with the network controller, the remote terminal includes a power supply 304 which receives power input from any two of the lines 21–23, as shown in FIG. 1, and which provides an output DC voltage V. The two power lines are also connected to the spread spectrum processor 302 for data input and data output as described hereinabove with respect to the network controller.

The microprocessor 301 and spread spectrum processor 302 share the same signals as described with regard to the network controller.

The microprocessor 301 receives an input from a temperature sensor 9 which is connected to the heatable vessel, for example, a water pipe or fuel pipe, which is spaced apart from the heating cable to provide a good indication of the temperature of the fluid or liquid in the vessel. Microprocessor 301 also receives an input from network controller address switches 303 which are set to the same network controller address as that of its associated network controller by its own switches 203. In this way, the remote terminal knows which network controller it is associated with and therefore a plurality of network controllers and associated remote terminals can communicate over the same power distribution system without interference.

Microprocessor 301 also receives a six bit address from remote terminal address dip switches 305 which allow the user to set a particular address for each remote terminal. Thus, the system can have $2^6$ remote terminal addresses for each network controller.

The microprocessor 301 also controls a power indicator light 306 to let a user know that the particular remote terminal is in operation.

Figure 7:
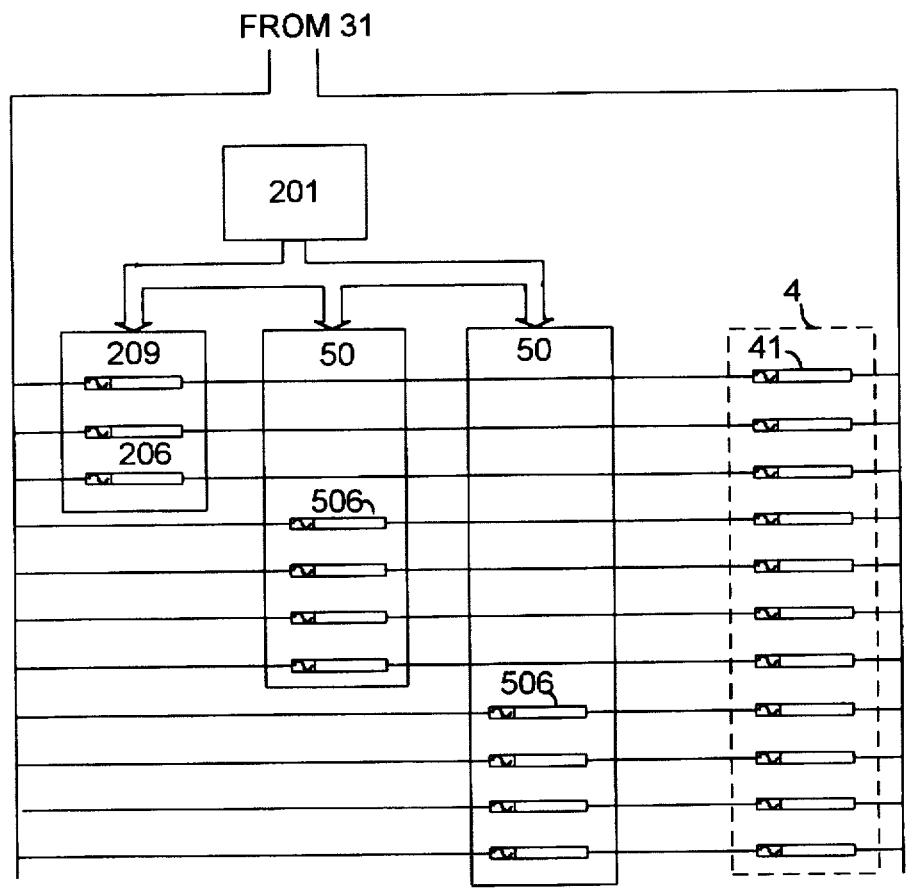
FIG. 7 is a schematic diagram of a network controller with two I/O expansion modules.

When, as is shown in FIGS. 1 and 2, it is necessary to control more than two heating cables, the system according to the present invention accomplishes this fact by the use of I/O expansion modules 50 connected to the network controller as is shown in FIG. 7.

Figure 8:
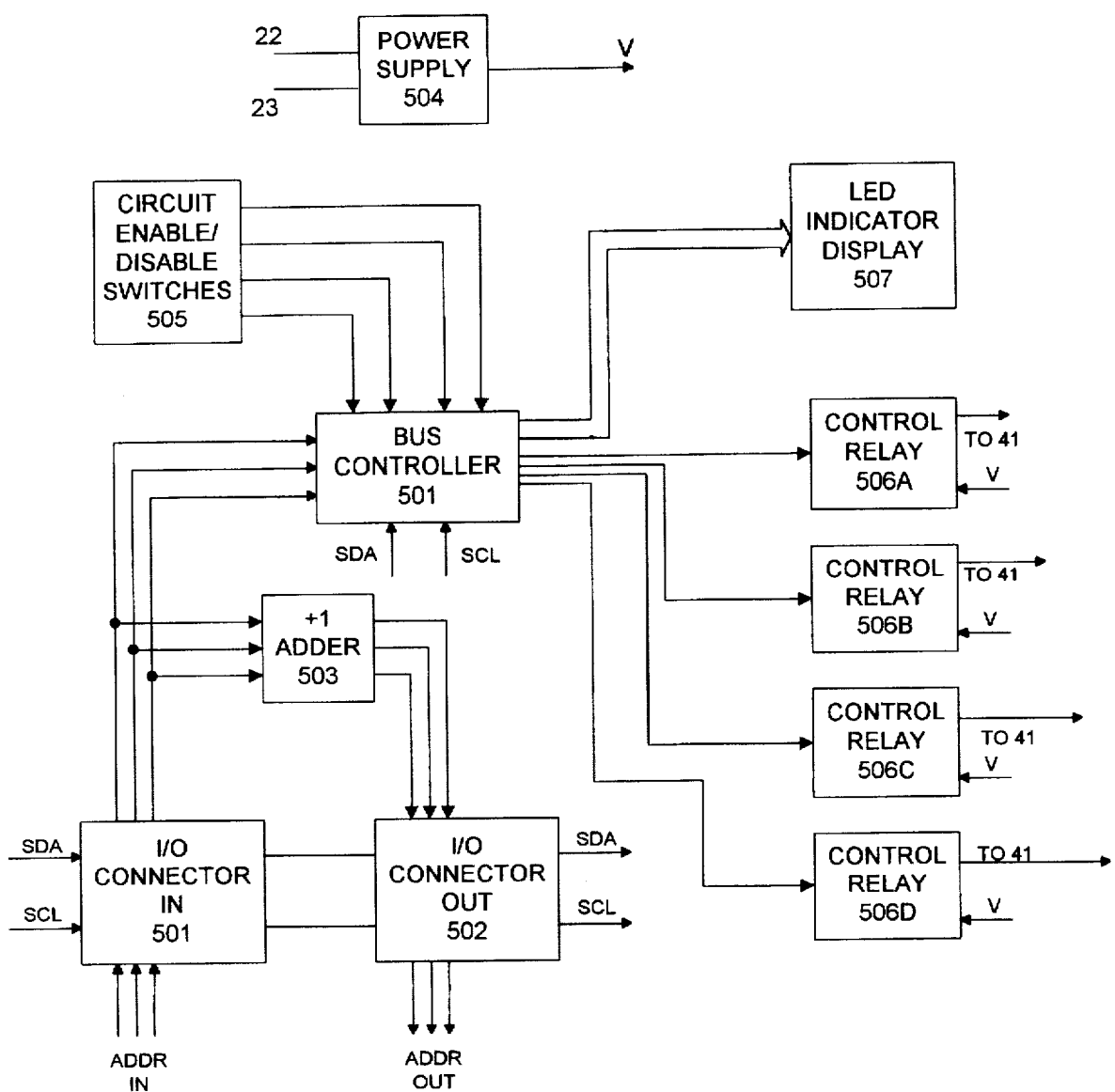
FIG. 8 is a detailed schematic drawing of an I/O module in accordance with the present invention.

Each I/O expansion module, which is shown in more detail in FIG. 8, is connected to the network controller in a daisy chain, as will be explained hereinafter, and has control relays 506A, 506B, 506C and 506D which, like control relays 206A and 206B, are used to control the relays 41 in the control panel 40. As is shown, the indicator light display 507 with LED is corresponding to the indicator display 207 of the network controller are controlled by microprocessor via the bus controller to indicate the state of the relays 506A–D.

Each I/O expansion module 50 includes an I/O input connector 501 which receives the three address signals and the data signal SDA and the clock signal SCL. The I/O expansion module includes an adder 503 which adds +1 to the address and applies it to the I/O output connector 502 which outputs the address input to the I/O expansion module plus one. The I/O connector also outputs the SDA and SCL signals without any change.

The expansion module also includes a power supply 504 for supplying a DC voltage V from the power lines 22 and 23.

The I/O expansion module includes the circuit enable/disable switches 505 for the four control relays 506 to let the network controller know which of the control relays are being used for controlling heating cables. The bus controller 501 is preferably a bi-directional serial bus integrated circuit PCF8574 which implements an I²C bus for the system. The bus controller also receives the SDA and SCL signals for converting them to control data for the control relays 506. The LED indicator display 507 indicates the same status on the I/O modules for zones 3–22 as that of the network controller, with the exception of the network controller power on indicator and the common failure indicator. As a result, there are three indicator lights for each heating cable, for a total of twelve lights on each expansion module.

As a result of the adder circuitry 503 on each I/O expansion module, each I/O expansion module is assigned an address on the basis of its position in the daisy chain. Thus, there is no need for the user to assign an address for each I/O expansion module by means of dip switches or hardwiring.

Since the first expansion module has the address 011, the system can handle up to five expansion modules having the address 011, 100, 101, 110 and 111. Each can control four cables and with the network controller controlling two cables, the total number of cables that can be controlled is twenty-two. Of course, the address can be expanded to more than three bits to connect more expansion modules to handle more cables.

Figure 9:
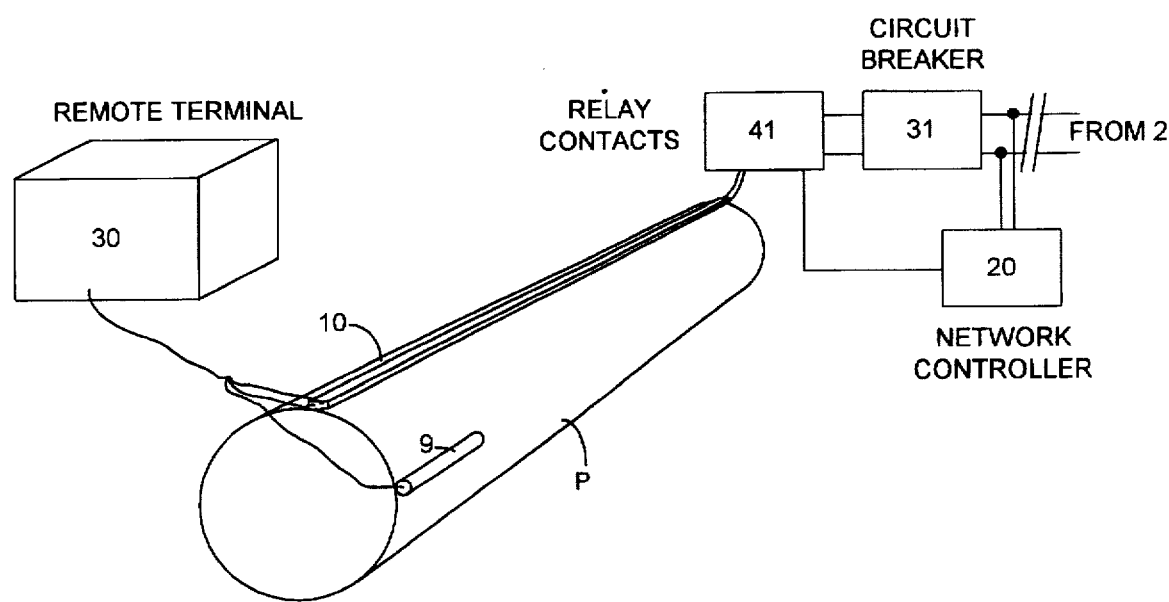
FIG. 9 shows a typical connection of the system of the present invention to a pipe.

FIG. 9 illustrates a typical embodiment of the present invention connected to a water pipe P. As shown, the heating cable 10 is connected along the water pipe with the temperature sensor 9 disposed at a suitable distance from the heating cable 10 and directly on the outer surface of pipe P. The remote terminal 30 is connected at the end of the heating cable 10 and the control contacts 41 are connected at the beginning of the heating cable 10. The control contacts 41 are controlled by the network controller 20 or on the I/O expansion module 50 and receive power from the power distribution system 2 via circuit breaker 31 as shown. Remote terminal 30 communicates with network controller 20 via its connection to heating cable 10, heating cable 10, the connection to contacts 41, circuit breaker 31 and power lines 21–23.

Figure 5:
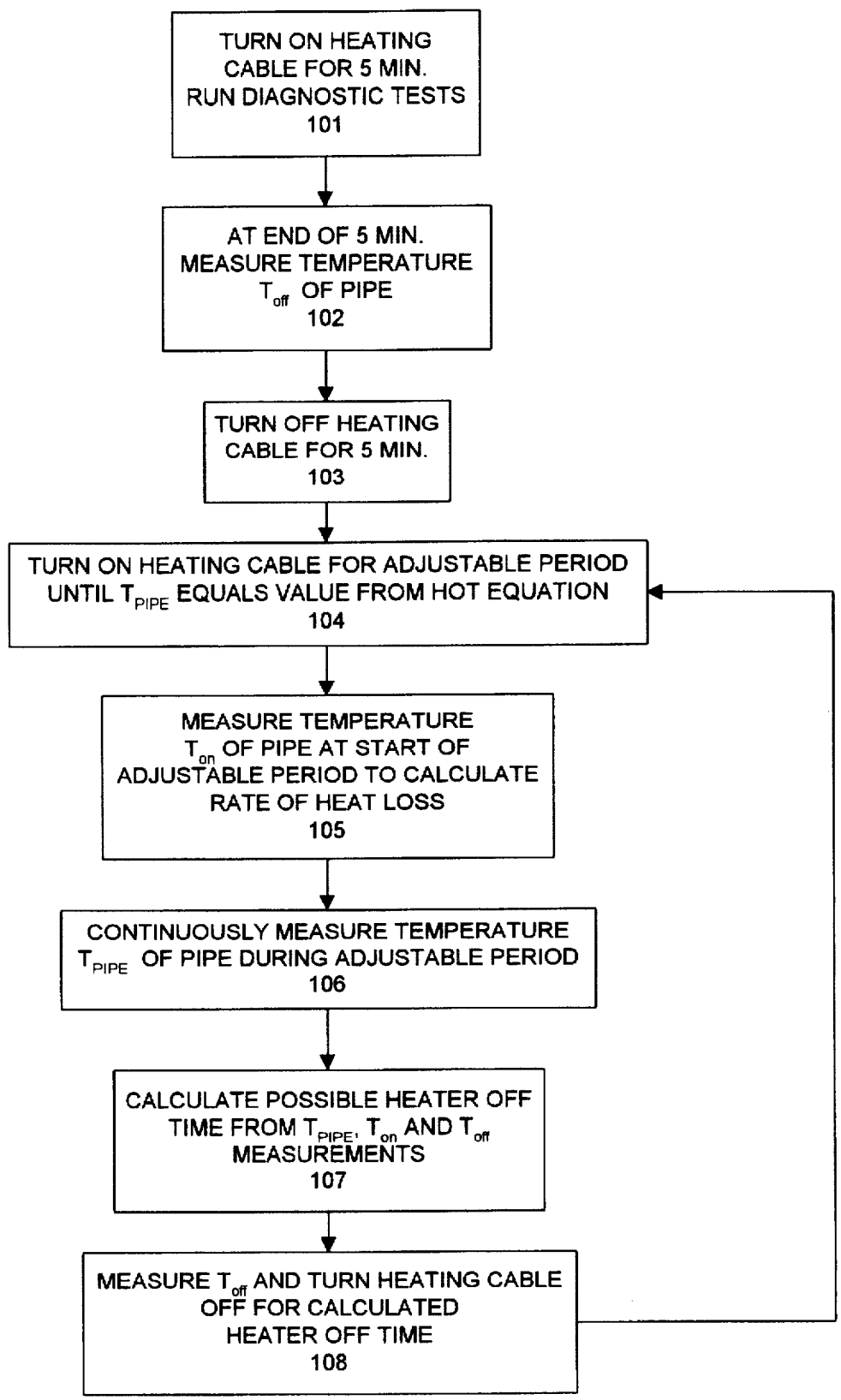
FIG. 5 is a flow diagram of a control method in accordance with the present invention.
Figure 6:
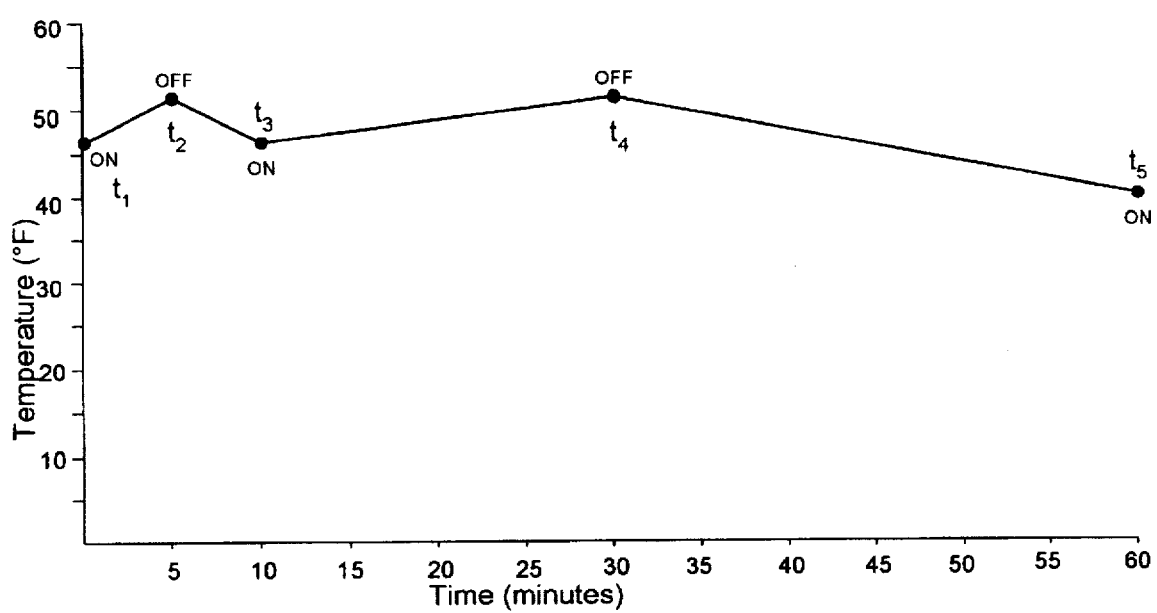
FIG. 6 is a graph of the control method in accordance with the present invention.

The manner in which the network controller controls each heating cable is described in more detail with regard to FIGS. 5 and 6.

Upon initialization of the system, the network controller closes the contacts 41 on the control panel 4 for each of the heating cables 10 associated therewith. The heating cables are turned on for five minutes in step 101 to run self-diagnostic tests on the entire heat tracing system including the heating cable, power wiring field connections and splices, the remote terminals, temperature sensors and associate components of the system. It does this by a protocol which sends four byte packets of information at high speed using the spread spectrum communication technique. The four byte packet from the network controllers each comprise one byte with a network controller request, one byte with a network controller identifier, one byte with checksum data and one byte with the network controller address or ID.

Each remote terminal receives the four byte packet and samples the temperature information at 100 times per second. Each remote controller then communicates four byte packets of information including one byte with the remote terminal address or ID, one byte with temperature data, one byte with checksum data and one byte with network controller address or ID using the spread spectrum communication technique. The checksum data from the remote terminal is always equal to the temperature data plus one.

From this communication of data during the first five minutes of on time, the network controller is able to run the diagnostic tests to insure that the system is operating properly. If not, the network controller will cause one or more of the indicator lights to be turned on indicating a failure situation.

If the temperature data to the microprocessor 201 from a sensor indicates that the sensor has failed, the microprocessor will assume a fail-safe operation wherein the associated cable will be kept on and a sensor failure indicator light will be energized.

After the first five minutes of on time, each heating cable is turned off for five minutes in step 103 if the temperature of the vessel is above 40° F. However, before the cable is turned off, the temperature $T_{off}$ of the heatable vessel, which in the case of the embodiment described in FIG. 5 is a pipe, is measured in step 102.

After five minutes of off time, each heating cable is turned on by the network controller in step 104. The temperature of the pipe at the time that the cable is turned on, $T_{on}$, is measured in step 105. At this point, the rate of heat loss can be determined from the difference of the measured temperatures $T_{off}$–$T_{on}$, divided by 5 minutes.

The measured temperatures $T_{on}$ and $T_{off}$ are used by the network controller in accordance with the present invention for calculating a time that the heater can remain off before it must turn on again to insure that the temperature of the pipe does not fall below a given set point temperature.

This is carried out in accordance with the present invention by determining the rate of temperature drop and temperature increase and initiating a temperature monitoring procedure to energize the cable at the temperature set point. The timing of the monitoring procedure is self-adjustable and based on the pipe temperature.

The general form of the heating off time (HOT) equation is:

$$t_{min} \leq \frac{T_{pipe} - T_{set}}{\frac{T_{pipe_{off}} - T_{pipe_{on}}}{t_{on} - t_{off}}} \leq t_{max} \text{ (HOT)}$$

wherein:

$T_{set}$ is the set point temperature for the vessel;
$t_{min}$ is the minimum off time for the heating cable
$t_{max}$ is the maximum off time for the heating cable;
$T_{pipe}$ is the current temperature of the vessel;
$T_{pipe(on)}$ is the temperature of the vessel when the heating cable is turned on;
$T_{pipe(off)}$ is the temperature of the vessel just before the heating cable is turned off;
$t_{on}$ is the time at which the heating cable is turned on;
$t_{off}$ is the time at which the heating cable is turned off.

The values for $T_{set}$, $t_{min}$ and $t_{max}$ for different liquids are shown in Table I:

TABLE I

| | Set (freeze protection) Temperature $T_{set}$ | Minimum Off Time $t_{min}$ | Maximum Off Time $t_{max}$ |
|---|---|---|---|
| Water | 40° F. | 30 minutes | 6 × $T_{pipe(on)}$ − 210 |
| Fuel Oil | 50° F. | 30 minutes | 6 × $T_{pipe(on)}$ − 230 |
| Diesel Fuel | 50° F. | 30 minutes | 6 × $T_{pipe(on)}$ − 230 |

For water, the equation becomes the following:

$$30 \text{ min.} \leq \frac{T_{pipe} - 40° \text{F.}}{\frac{T_{pipe_{off}} - T_{pipe_{on}}}{t_{on} - t_{off}}} \leq 6 \cdot T_{pipe_{on}} - 210$$

In accordance with the above HOT equation, the network controller continuously receives data relating to the actual current pipe temperature $T_{PIPE}$ in step 106 and calculates in step 107 the pipe temperature that is necessary for the heating cable to remain off for a time greater than a minimum time and less than some predetermined maximum time. For the case of water, in a preferred embodiment of the present invention, the minimum off time is thirty minutes and the maximum off time is six times the temperature of the pipe when it is turned on minus 210, for a set point temperature of 40° F. Once that pipe temperature is reached, the $T_{off}$ temperature is measured and the heating cable is turned off for the calculated time in step 108. The new $T_{off}$ temperature is used with the new $T_{on}$ measured when step 105 is repeated to recalculate heat loss in the HOT equation.

FIG. 6 illustrates the manner in which the water temperature in a pipe will vary when heated by a heating cable controlled in accordance with the present invention described above. In FIG. 6, $t_1$ is the time when the system is first turned on and $t_2$ is when it is first turned off. When it is turned on again at $t_3$, it is the slope of $t_2$–$t_3$ that is used to first determine heat loss. The pipe temperature is continuously measured during $t_3$–$t_4$ until the right temperature is reached and the cable is shut off during $t_4$–$t_5$. It is the slope of $t_4$–$t_5$ that determines the heat loss rate for the next off period.

This control system in accordance with the present invention is particularly advantageous for the use in a spread spectrum communication technique using only a two wire heating cable. This results from the fact that communication between the network controller and the remote terminal preferably connected at the end of the heating cable, can only occur when the contacts 41 are closed and the power is applied to the heating cable. Otherwise, the communication link is interrupted and no communication can occur. Thus, all of the determinations as to the amount of time that the heating cable can be off, must be made when the heating cable is on. Moreover, once the heating cable is off, the network controller is not able to obtain temperature information and thus must rely on calculations made during the time that the heating cable was on.

The control system according to the present invention also has the advantage of saving power, since no power is used during the time that the heating cable is turned off.

Thus in accordance with the present invention, the network controller microprocessor makes the calculations in accordance with the HOT equation with the preselected minimum temperature, maximum temperature and set point and the temperature data obtained from each remote controller for each pipe and heating cable being monitored, in order to determine the time in which that heating cable can remain off to insure that the pipe temperature does not drop below the set point.

After the calculation is made, the heating cable is turned off for the calculated heater off time. Thereafter, each heating cable is turned on again in step 104 so that the process steps 104–108 can be repeated.

If the information transmitted to the network controller from any remote terminal indicates a failure of the type noted hereinbefore, at least one indicator light is turned on to indicate a failure to the user so that a repair can be made.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A system for controlling a plurality of heating cables, wherein each heating cable has two conductors and is disposed in contact with a heatable vessel during use to heat the vessel and is connectable to power lines having at least two conductors for applying power thereto, the system comprising:

a plurality of first switches each connectable between one heating cable and power lines and each responsive to a control signal for selectively connecting and disconnecting the one heating cable to and from the power lines;

a plurality of addressable remote terminals each connectable to one heating cable and having a temperature sensor for detecting the temperature of a heatable vessel heated by the one heating cable, a processor for controlling bi-directional communications and a first spread spectrum transceiver connectable to the two conductors of the one heating cable and controlled by the processor for transmitting temperature data relating to temperatures detected by the temperature sensor over a network including the one heating cable and the power lines and receiving data over the network including the power lines;

at least one addressable main controller for controlling the plurality of first switches and comprising a processor for controlling bi-directional communications, a second spread spectrum transceiver connected to two of the power line conductors for transmitting data over the network including the power lines to the remote terminals and for receiving temperature data transmitted from each first spread spectrum transceiver over the network including the power lines, wherein the processor is receptive of the temperature data from the plurality of remote terminals for producing a plurality of control signals as a function thereof and further comprising circuitry for applying each control signal to one first switch.

2. The system according to claim 1, wherein the processor in the at least one main controller produces the plurality of the control signals to connect the heating cables to the power lines for a first time period and disconnect the heating cables from the power lines for a second time period determined from the temperature data and which is at least equal to a minimum time period.

3. The system according to claim 1, wherein the processor in the at least one main controller determines a cooling rate for each vessel from the temperature data and produces the plurality of the control signals to connect the heating cables to the power lines for a first time period and disconnect the heating cables from the power lines for a second time period as a function of the cooling rate of each vessel.

4. The system according to claim 1, wherein one remote terminal is connected to the end of each heating cable.

5. The system according to claim 1, wherein each at least one main controller comprises at least one expansion module connected to the at least one main controller in a daisy chain and each having circuitry for applying control signals to different plurality of first switches.

6. The system according to claim 5, wherein the main controller has an address circuit for assigning an address to a first expansion module and wherein each expansion module has an adder for adding one to its address to assign a different address to a next expansion module in the daisy chain.

7. The system according to claim 1, wherein the first spread spectrum transceiver transmits data in four byte packets comprising one byte of remote terminal address data, one byte of temperature data, one byte of checksum data and one byte of main controller address data and wherein the checksum data of the first spread spectrum transceiver transmits data in four byte packets comprising one byte of a main controller request, one byte of a main controller identifier, one byte of checksum data and one byte of main controller address data.

8. The system according to claim 2, wherein the first and second time periods are determined as follows $$t_{min} \leq \frac{T_{pipe} - T_{set}}{\frac{T_{pipe_{off}} - T_{pipe_{on}}}{t_{on} - t_{off}}} \leq t_{max}$$

wherein:

$T_{set}$ is the set point temperature for the vessel;

$t_{min}$ is the minimum off time for the heating cable $t_{max}$ is the maximum off time for the heating cable;

$T_{pipe}$ is the current temperature of the vessel;

$T_{pipe(on)}$ is the temperature of the vessel when the heating cable is turned on;

$T_{pipe(off)}$ is the temperature of the vessel just before the heating cable is turned off;

$t_{on}$ is the time at which the heating cable is turned on;

$t_{off}$ is the time at which the heating cable is turned off.

9. A method for controlling heating cables, comprising the steps of:

disposing a plurality of two-conductor heating cables each in contact with a heatable vessel to heat the vessel;

connecting power lines having at least two conductors to each heating cable through a plurality of first switches each first switch connectable between one heating cable and the power lines and each first switch responsive to a control signal for selectively connecting and disconnecting one heating cable to and from the power lines;

connecting each of a plurality of addressable remote terminals to the two conductors of one heating cable and detecting the temperature of a heatable vessel heated by the one heating cable;

connecting at least one addressable main controller, each for controlling a plurality of first switches, to two of the power line conductors;

bi-directionally transmitting temperature data relating to temperatures detected by the temperature sensors from the remote terminals over a network including the heating cables and the power lines by spread spectrum data transmission to the at least one main controller and receiving data over the network including the power lines transmitted from the at least one main controller by spread spectrum transmission;

controlling bi-directional communication with a microprocessor in each main controller and remote terminal; and producing a plurality of control signals at the at least one main controller as a function of the temperature data and applying each control signal to one first switch.

10. The method according to claim 9, wherein the plurality of the control signals act to connect the heating cables to the power lines for a first time period and disconnect the heating cables from the power lines for a second time period determined from the temperature data and which is at least equal to a minimum time period.

11. The method according to claim 9, further comprising determining a cooling rate for each vessel from the temperature data and wherein the plurality of the control signals act to connect the heating cables to the power lines for a first time period and disconnect the heating cables from the power lines for a second time period as a function of the cooling rate of each vessel.

12. The method according to claim 9, wherein one remote terminal is connected to the end of each heating cable.

13. The method according to claim 9, wherein control signals are applied to different pluralities of first switches by daisy chaining at least one expansion module to each at least one main controller.

14. The method according to claim 13, wherein the main controller assigns an address to a first expansion module and each expansion module adds one to its address to assign a different address to a next expansion module in the daisy chain.

15. The method according to claim 9, wherein the step of transmitting comprises transmitting data in four byte packets comprising one byte of remote terminal address data, one byte of temperature data, one byte of checksum data and one byte of main controller address data and wherein the checksum data is equal to the temperature data plus one.

16. The method according to claim 10, wherein the first and second time periods are determined as follows $$t_{min} \leq \frac{T_{pipe} - T_{set}}{\frac{T_{pipe_{off}} - T_{pipe_{on}}}{t_{on} - t_{off}}} \leq t_{max}$$

wherein:

$T_{set}$ is the set point temperature for the vessel;

$t_{min}$ is the minimum off time for the heating cable $t_{max}$ is the maximum off time for the heating cable;

$T_{pipe}$ is the current temperature of the vessel;

$T_{pipe(on)}$ is the temperature of the vessel when the heating cable is turned on;

$T_{pipe(off)}$ is the temperature of the vessel just before the heating cable is turned off;

$t_{on}$ is the time at which the heating cable is turned on;

$t_{off}$ is the time at which the heating cable is turned off.

17. A method for controlling at least one process in a structure having power lines, the method comprising the steps of:

disposing a plurality of addressable remote terminals throughout the structure, wherein each remote terminal includes a sensor for sensing a process parameter;

bi-directionally transmitting data corresponding to the sensed process parameter from each remote terminal over a network including the power lines by spread spectrum transmission to at least one addressable main controller and transmitting data from the at least one addressable main controller to the plurality of addressable remote terminals over the network including the power lines by spread spectrum transmission.

18. The method according to claim 17, wherein each remote terminal has an address, wherein each main controller has an address and wherein the step of transmitting comprises transmitting data in four byte packets comprising one byte of remote terminal address data, one byte of process parameter data, one byte of checksum data and one byte of main controller address data.

19. The method according to claim 18, wherein the checksum data is equal to the process parameter data plus one.

20. The method according to claim 18, wherein at least one main controller comprises at least one expansion module and wherein each main controller assigns an address to a first expansion module and each expansion module adds one to its address to assign a different address to a next expansion module in the daisy chain.

21. The method according to claim 17, wherein the process parameter is temperature.

22. The method according to claim 17, wherein the power lines have at least two conductors.

23. The method according to claim 17, wherein the power lines have three conductors.

* * * * *